(12) United States Patent
Ferrara et al.

(10) Patent No.: US 12,184,902 B2
(45) Date of Patent: Dec. 31, 2024

(54) USE OF EMBEDDED SIGNALING TO CORRECT SIGNAL IMPAIRMENTS

(71) Applicant: V-NOVA INTERNATIONAL LIMITED, London (GB)

(72) Inventors: Simone Ferrara, London (GB); Guido Meardi, London (GB)

(73) Assignee: V-NOVA INTERNATIONAL LIMITED, London (GB)

( * ) Notice: Subject to any disclaimer, the term of this patent is extended or adjusted under 35 U.S.C. 154(b) by 162 days.

(21) Appl. No.: 17/766,119

(22) PCT Filed: Oct. 2, 2020

(86) PCT No.: PCT/GB2020/052419
§ 371 (c)(1),
(2) Date: Apr. 1, 2022

(87) PCT Pub. No.: WO2021/064412
PCT Pub. Date: Apr. 8, 2021

(65) Prior Publication Data
US 2022/0345753 A1    Oct. 27, 2022

Related U.S. Application Data

(60) Provisional application No. 62/984,261, filed on Mar. 2, 2020.

(30) Foreign Application Priority Data

Oct. 2, 2019  (GB) .................................. 1914215
Oct. 6, 2019  (GB) .................................. 1914414
(Continued)

(51) Int. Cl.
*H04N 19/86*    (2014.01)
*H04N 19/12*    (2014.01)
(Continued)

(52) U.S. Cl.
CPC ............ *H04N 19/86* (2014.11); *H04N 19/12* (2014.11); *H04N 19/124* (2014.11);
(Continued)

(58) Field of Classification Search
CPC .... H04N 19/117; H04N 19/86; H04N 19/865; H04N 19/85; H04N 19/70; H04N 19/12;
(Continued)

(56) References Cited

U.S. PATENT DOCUMENTS

2007/0140574 A1*  6/2007  Yamaguchi ............ H04N 19/44
                                                        375/E7.176
2008/0063085 A1*  3/2008  Wu ....................... H04N 19/117
                                                        375/240.26
(Continued)

FOREIGN PATENT DOCUMENTS

EP          2700234          2/2014

OTHER PUBLICATIONS

Snow et al. "Reports from the SMPTE Technology Committees" SMPTE Motion Imaging Journal, Date of Publication Aug. 19, 2019. (Year: 2019).*

(Continued)

*Primary Examiner* — Nathnael Aynalem
(74) *Attorney, Agent, or Firm* — Workman Nydegger

(57) ABSTRACT

Examples described herein relate to decoding and encoding signals. A method of performing signal enhancement operations on one or more portions of a signal is described, wherein the performing is based at least in part on information embedded in one or more values received in one or more encoded data layers transmitted within a stream of encoded data, and wherein said values are associated with transformed coefficients intended to be processed by a (Continued)

decoder for deriving elements of the signal, wherein the information indicates an impairment associated with a portion of the signal.

20 Claims, 6 Drawing Sheets

(30) Foreign Application Priority Data

| Oct. 6, 2019 | (GB) | ................................... | 1914416 |
| Oct. 25, 2019 | (GB) | ................................... | 1915553 |
| Jan. 12, 2020 | (GB) | ................................... | 2000430 |
| Jan. 31, 2020 | (GB) | ................................... | 2001408 |
| Apr. 27, 2020 | (GB) | ................................... | 2006183 |
| Jun. 30, 2020 | (GB) | ................................... | 2010015 |

(51) Int. Cl.

| *H04N 19/124* | (2014.01) |
| *H04N 19/132* | (2014.01) |
| *H04N 19/136* | (2014.01) |
| *H04N 19/154* | (2014.01) |
| *H04N 19/156* | (2014.01) |
| *H04N 19/159* | (2014.01) |
| *H04N 19/18* | (2014.01) |
| *H04N 19/184* | (2014.01) |
| *H04N 19/30* | (2014.01) |
| *H04N 19/34* | (2014.01) |
| *H04N 19/46* | (2014.01) |
| *H04N 19/61* | (2014.01) |
| *H04N 19/70* | (2014.01) |

(52) U.S. Cl.
CPC ......... *H04N 19/132* (2014.11); *H04N 19/136* (2014.11); *H04N 19/154* (2014.11); *H04N 19/156* (2014.11); *H04N 19/159* (2014.11); *H04N 19/18* (2014.11); *H04N 19/184* (2014.11); *H04N 19/30* (2014.11); *H04N 19/34* (2014.11); *H04N 19/46* (2014.11); *H04N 19/61* (2014.11); *H04N 19/70* (2014.11)

(58) Field of Classification Search
CPC ...... H04N 19/124; H04N 19/18; H04N 19/46; H04N 19/463; H04N 19/132; H04N 19/136; H04N 19/154; H04N 19/156; H04N 19/159; H04N 19/176; H04N 19/182; H04N 19/184; H04N 19/30; H04N 19/33; H04N 19/34; H04N 19/59; H04N 19/61
USPC ............................................. 375/240–240.29
See application file for complete search history.

(56) References Cited

U.S. PATENT DOCUMENTS

| 2010/0278231 | A1 | 11/2010 | Gutman et al. | |
| 2014/0321555 | A1* | 10/2014 | Rossato | ................ H04N 19/88 |
| | | | | 375/240.26 |
| 2017/0048528 | A1 | 2/2017 | Filippov et al. | |
| 2020/0404263 | A1* | 12/2020 | Hu | ........................ H04N 19/86 |

OTHER PUBLICATIONS

"Strong start in coding and compression for Three Degrees of Freedom Plus (3DoF+)" Geneva, Switzerland—The 126th WG 11 (MPEG) meeting was held in Geneva, Switzerland, rom Mar. 25-29, 2019. (Year: 2019).*

International Search Report and Written Opinion for PCT/GB2020/052419 mailed Dec. 16, 2020.

Li Songbin et al., "An Information Hiding Approach Based on Integer Transform Coefficient and Virtual Space Encoding for H.264/AVC", Circuits, Systems and Signal Processing, Cambridge, MS, US, vol. 34, No. 11, Mar. 20, 2015, pp. 3573-3594, XP035547214, ISSN: 0278-081X, DOI: 10.1007/S00034-015-0024-6, retrieved on Mar. 20, 2015.

"Working Draft of Low Complexity Enhancement Video Coding", 126. MPEG Meeting: Mar. 25, 2019-Mar. 29, 2019; Geneva, Motion Picture Expert Group or ISO/IEC JTC1/SC29/WG11), No. n18454, Apr. 18, 2019, XP030208724, retrieved from the internet: http://phenix.int-evry.fr/pmeg/doc_end_user/documents/126_Geneva/wg11/w18454.zipN18454.docx, retrieved on Apr. 18, 2019.

Urhan O et al., "Parameter Embedding Mode and Optimal Post-Process Filtering for Improved WDCT Image Compression", IEEE Transactions on Circuits and Systems for Video Technology, Institute of Electrical and Electronics Engineers, US, vol. 18, No. 4, Apr. 1, 2008, pp. 528-532, XP011204311, ISSN: 1051-8215.

* cited by examiner

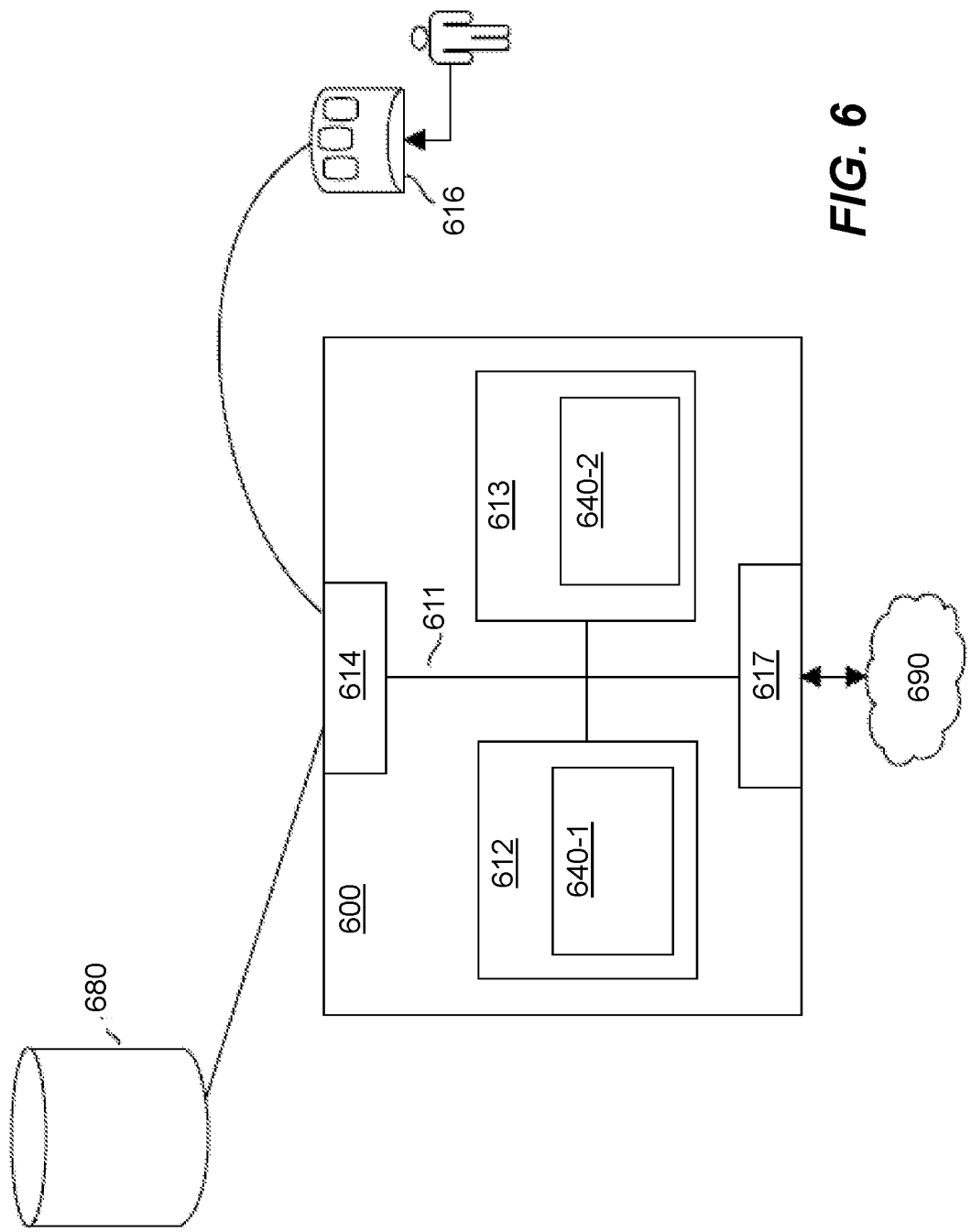

USE OF EMBEDDED SIGNALING TO CORRECT SIGNAL IMPAIRMENTS

CROSS-REFERENCE TO RELATED APPLICATIONS

The present application is a 371 US Nationalization of International Patent Application No. PCT/GB2020/052419, filed Oct. 2, 2020, which claims priority to U.S. patent application Ser. No. 62/984,261, filed Mar. 2, 2020, and to UK Patent Application Nos: 1914215.7, filed Oct. 2, 2019, 1914416.1, filed Oct. 6, 2019, 1914414.6, filed Oct. 6, 2019, 1915553.0, filed Oct. 25, 2019, 2000430.5, filed Jan. 12, 2020, 2001408.0, filed Jan. 31, 2020, 2006183.4, filed Apr. 27, 2020, and 2010015.2, filed Jun. 30, 2020. The entire disclosures of the aforementioned applications are incorporated herein by reference.

TECHNICAL FIELD

The present invention relates to methods for processing signals, such as by way of non-limiting examples video, images, hyperspectral images, audio, point clouds, 3DoF/6DoF and volumetric signals. Processing data may include, but is not limited to, obtaining, deriving, encoding, outputting, receiving and reconstructing a signal in the context of a hierarchical (tier-based) coding format, where the signal is decoded in tiers at subsequently higher level of quality, leveraging and combining subsequent tiers ("echelons") of reconstruction data. Different tiers of the signal may be coded with different coding formats (e.g., by way of non-limiting examples, traditional single-layer DCT-based codecs, ISO/IEC MPEG-5 Part 2 Low Complexity Enhancement Video Coding SMPTE VC-6 2117, etc.), by means of different elementary streams that may or may not multiplexed in a single bitstream.

BACKGROUND

In tier-based coding formats, such as ISO/IEC MPEG-5 Part 2 LCEVC (hereafter "LCEVC"), or SMPTE VC-6 2117 (hereafter "VC-6"), a signal is decomposed in multiple "echelons" (also known as "hierarchical tiers") of data, each corresponding to a "Level of Quality" (also referred to herein as "LoQ") of the signal, from the highest echelon at the sampling rate of the original signal to a lowest echelon, which typically has a lower sampling rate than the original signal. In the non-limiting example when the signal is a picture in a video stream, the lowest echelon may be a thumbnail of the original picture, e.g. a low-resolution frame in video stream, or even just a single picture element. Other echelons contain information on correction to apply to a reconstructed rendition in order to produce the final output. Echelons may be based on residual information, e.g. a difference between a version of the original signal at a particular level of quality and a reconstructed version of the signal at the same level of quality. A lowest echelon may not comprise residual information but may comprise the lowest sampling of the original signal. The decoded signal at a given Level of Quality is reconstructed by first decoding the lowest echelon (thus reconstructing the signal at the first—lowest—Level of Quality), then predicting a rendition of the signal at the second—next higher—Level of Quality, then decoding the corresponding second echelon of reconstruction data (also known as "residual data" at the second Level of Quality), then combining the prediction with the reconstruction data so as to reconstruct the rendition of the signal at the second—higher—Level of Quality, and so on, up to reconstructing the given Level of Quality.

Reconstructing the signal may comprise decoding residual data and using this to correct a version at a particular Level of Quality that is derived from a version of the signal from a lower Level of Quality. Different echelons of data may be coded using different coding formats, and different Levels of Quality may have different sampling rates (e.g., resolutions, for the case of image or video signals). Subsequent echelons may refer to a same signal resolution (i.e., sampling rate) of the signal, or to a progressively higher signal resolution. Examples of these approaches are described in more detail in the available specifications for LCEVC and VC-6.

When using a tier-based coding format, residual data for one or more layers of quality may be used to correct impairments that are introduced by a lower encoding method. For example, in LCEVC, image artifacts that are introduced by a process of base encoding and decoding (e.g., using a known codec such as H.264 or H.265) may be corrected by enhancement data streams comprising residual data at one or more sub-layers. However, the greater the number of coding artifacts that are introduced, the higher the target bit rate that is required to carry the residual data. This can be an issue if network bandwidth is limited and the available bit rate is low. In this case, there is a trade-off between the bit rate for the encoded enhancement or higher-level residual data streams and the quality of the reconstructed signal at the decoder. It is thus desired to improve encoding schemes such as LCEVC and VC-6 in cases where the target bit rate is low, and/or where a low-level encoding method with a poor-quality output is used.

SUMMARY

Non-limiting embodiments illustrated herein refer to a signal as a sequence of samples (i.e., two-dimensional images, video frames, video fields, sound frames, etc.). In the description the terms "image", "picture" or "plane" (intended with the broadest meaning of "hyperplane", i.e., array of elements with any number of dimensions and a given sampling grid) will be often used to identify the digital rendition of a sample of the signal along the sequence of samples, wherein each plane has a given resolution for each of its dimensions (e.g., X and Y), and comprises a set of plane elements (or "element", or "pel", or display element for two-dimensional images often called "pixel", for volumetric images often called "voxel", etc.) characterized by one or more "values" or "settings" (e.g., by ways of non-limiting examples, colour settings in a suitable colour space, settings indicating density levels, settings indicating temperature levels, settings indicating audio pitch, settings indicating amplitude, settings indicating depth, settings indicating alpha channel transparency level, etc.). Each plane element is identified by a suitable set of coordinates, indicating the integer positions of said element in the sampling grid of the image. Signal dimensions can include only spatial dimensions (e.g., in the case of an image) or also a time dimension (e.g., in the case of a signal evolving over time, such as a video signal).

As non-limiting examples, a signal can be an image, an audio signal, a multi-channel audio signal, a telemetry signal, a video signal, a 3DoF/6DoF video signal, a volumetric signal (e.g., medical imaging, scientific imaging, holographic imaging, etc.), a volumetric video signal, or even signals with more than four dimensions.

For simplicity, non-limiting embodiments illustrated herein often refer to signals that are displayed as 2D planes of settings (e.g., 2D images in a suitable colour space), such as for instance a video signal. The terms "picture", "frame" or "field" will be used interchangeably with the term "image", so as to indicate a sample in time of the video signal: any concepts and methods illustrated for video signals made of frames (progressive video signals) can be easily applicable also to video signals made of fields (interlaced video signals), and vice versa. Despite the focus of embodiments illustrated herein on image and video signals, people skilled in the art can easily understand that the same concepts and methods are also applicable to any other types of multidimensional signal (e.g., audio signals, volumetric signals, stereoscopic video signals, 3DoF/6DoF video signals, plenoptic signals, point clouds, etc.).

Examples described herein relate to using information embedded in one or more values received in one or more encoded data layers transmitted within a stream of encoded data to signal an impairment associated with a portion of a signal to be reconstructed. In particular, the examples use information embedded in transformed coefficient values to signal one or more impairments, such that these may be at least partially corrected by signal enhancement operations applied when reconstructing the signal, e.g. at a decoder. For example, both LCEVC and VC-6 encode residual data by using transformation and quantization encoding blocks applied in turn. In the present examples, the quantized transformed residual values, referred to herein as transformed coefficients, are used to carry signalling information relating to signal impairments, as well as the residual data itself. The transformed coefficients are thus used to provide a form of embedded signalling within encoded data streams. The signal enhancement operations may be enhancement operations that are not defined in one or more of the LCEVC or VC-6 video coding standards, e.g. comprise so-called out-of-standard operations that are nevertheless compatible with the standards. The present examples may thus be implemented as optional extensions to the aforementioned standards, or other tier-based hierarchical coding schemes.

According to certain described embodiments, a signal processor (e.g., computer processor hardware) is configured to receive data and decode it ("decoder"). The decoder implements a method of decoding data. The decoder may implement a tier-based decoding method, such as LCEVC or VC-6. In these cases, the decoder obtains a rendition of the signal at a first (e.g., lower) level of quality and produces a predicted rendition of the signal at a second (e.g., higher) level of quality. The second level of quality may, for example, have a higher resolution (i.e., signal sampling rate) than the first level of quality. in these cases, as described in the tier-based decoding methods, the decoder receives and decodes an echelon of residual data to apply to the predicted rendition of the signal in order to produce a corrected rendition of the signal at the second level of quality. In certain examples described herein, when decoding a specific set of residual data coefficients and finding a specific set of quantized symbols, the decoder does not interpret said symbols as residual data, but instead performs signal-enhancement operations according to the received symbols. These signal enhancement operations may then help remove or reduce the impairments. In cases where a bit rate is limited, a better-quality picture may be generated by employing a known class of signal enhancement operations at the decoder, rather than attempting to correct all of the impairment using residual data. For example, signalling one of four signal enhancement operations may only require 2 bits and signalling one of sixty-four signal enhancement operations may only require 6 bits. As the signalling of impairments is carried within encoded data, the signalling may be localised for particular portions of the signal, e.g. debanding may only be signalled within coding units for some but not all of the coding units of the complete picture. The present methods thus provide a means to apply localised correction of impairments using localised signal enhancement operations. The present approaches may be used to apply signal enhancement operations at one or more of a first and second level of quality, based on embedded signalling data carried in residual data for one or more of these levels.

In some non-limiting embodiments, a bit in the decoded bytestream signals to the decoder that additional information may have been embedded in some residual data coefficients, and thus that a specific set of symbols in a specific set of residual data should not be interpreted as actual residual data, but as contextual information to inform signal enhancement operations. In a non-limiting embodiment, some reserved symbols correspond to specific types of impairments, informing the decoder on postprocessing operations that may be applied to a corresponding area of the signal in order to improve the quality of the final signal reconstruction.

In some non-limiting embodiments, the decoder implements signal enhancement operations in a different way, including at times not implementing them at all, based on the processing power available at the decoder device at any one time. For example, even if a particular signal enhancement operation and/or impairment is signalled, one or more signal enhancement operations are only performed if a resource metric at the decoder indicates available resources above a predefined threshold.

In some non-limiting embodiments, the decoder applies the signal enhancement operations "in-loop". This means that the signal enhancement operations are performed as part of a decoding loop that operates over portions of the signal, rather than after a complete reconstructed frame is output. For example, signal enhancement operations to correct impairments may be signalled and applied before applying residual data decoded from an echelon of data that contains embedded information about blocking impairments. In other words, enhancement data comprising residuals may also carry signalling to instruct impairment correction before the residuals are applied. In other non-limiting embodiments, the decoder applies signal enhancement operations after having combined the preliminary rendition of the signal at the second level of quality with decoded residual data—for example this may be an "in-loop" adjustment for a decoding loop relating to the second level of quality, such as a sub-level 2 decoding operation in LCEVC. In other non-limiting embodiments, the decoder applies said signal enhancement methods at the end of the decoding process, after having produced a rendition of the signal at the final (highest) level of quality, i.e. "out-of-loop" following the output of a frame of video (e.g., for rendering).

In some non-limiting embodiment, the format in which at least a portion of the signal and the embedded contextual information are encoded is MPEG-5 Part 2 LCEVC ("Low Complexity Enhancement Video Coding"). For example, a signal may be encoded using a base encoder to create a base stream and an LCEVC encoder to create an enhancement stream (which may have two sub-layers). In this case, it is the decoding of the enhancement stream where signal enhancement operations are applied based on signalling of impairments that is embedded in the enhancement stream (e.g., at one or more of the sub-layers—the signalling embedded in transformed coefficients prior to entropy encoding). In other non-limiting embodiments, the format in which at least a portion of the signal and the embedded contextual information are encoded is SMPTE VC-6 ST-2117. For example, VC-6 may be implemented as a full codec where the lowest echelon of data is encoded as a lowest resolution image (e.g., in a video stream of images). In this case, residual data for echelons above the lowest echelon may have embedded signalling within the transformed coefficients for the residual data. where signalling for enhancements at a given level of quality may be embedded in the echelon for that level of quality or an echelon below.

According to certain other non-limiting embodiments, a signal processor (e.g., computer processor hardware) is configured to receive data and encode it ("encoder"). The encoder implements an encoding method, e.g. a corresponding encoding method to the decoding methods described herein. In the encoding, transformed coefficients for signal reconstruction are reserved to signal enhancement operations that to be performed on one or more portions of the signal to correct one or more impairments detected in the signal. For example, one or more quantized symbols of a given coefficient group such as one of the A, H, V, D coefficients for a 2 by 2 Hadamard transform as described in LCEVC and VC-6, or a coefficient produced by a larger 4 by 4 transformation (e.g., an HH coefficient), are used to provide embedded signalling to identify detected impairments and instruct one or more signal enhancement operations to correct them. This is in addition to the conventional use of the transformed coefficients, e.g. to provide encoded residual data to be added to a preliminary reconstruction generated from a lower level of quality.

In one set of examples, the encoder produces a rendition of the signal at a first (e.g., lower) level of quality and encodes it with a first coding method. This may be a base encoding as found with LCEVC, or a lowest echelon encoding in VC-6. The encoder then produces a predicted rendition of the signal at a second (e.g., higher) level of quality, and correspondingly produces and encodes an echelon of residual data at the second level of quality to apply to a predicted rendition of the signal at the second level of quality in order to produce a corrected rendition of the signal at the second level of quality. For example, the predicted rendition of the signal at the second level of quality may be generated from the rendition of the signal at the first level of quality (e.g., may comprise an output of an upsampling to sub-layer 2 in LCEVC). When detecting that the process of encoding the signal at the first level of quality produces one or more impairments that cannot be suitably corrected with residual data at a target bitrate (e.g., a bit rate available for a transmission to a decoder or for a particular file format for storage), the encoder leverages a set of reserved symbols in a set of residual data of the echelon of residual data at the second level of quality to signal to the decoder the type and/or the location of the impairments it should expect. The decoder is then able to selectively apply signal enhancement operations based on the type and/or location of the impairments. In this case, a location of the impairments may be determined by applying embedded signalling within data for a particular coding unit (e.g., a grid of residual values such as a 2 by 2 or 4 by 4 coding unit in LCEVC), wherein different coding units have different signalled impairments (or no signalled impairments and thus residual data as per a conventional application of a decoding method).

In some non-limiting embodiments, a bit in the encoded bytestream is toggled in order to signal to the decoder whether a given set of symbols in a given set of residual data should be interpreted as actual residual data or as additional contextual information to inform image enhancement operations.

In some non-limiting embodiment, the format used to encode at least a portion of the signal, e.g. residual data for the signal, and the embedded impairment information is MPEG-5 Part 2 LCEVC ("Low Complexity Enhancement Video Coding"). In other non-limiting embodiments, the format used to encode at least a portion of the signal and the embedded impairment information is SMPTE VC-6 ST-2117. For example, signalling to instruct one or more signal enhancement operations may be embedded with transformed coefficients as are received and decoded according to these standards.

According to other non-limiting embodiments, impairment information that is embedded in residual data includes a symbol corresponding to blocking impairments. In a non-limiting embodiment, a decoder implements a deblocking post-processing operation in the area of the signal corresponding to the residual coefficient containing the reserved symbol.

In a non-limiting embodiment, the decoder applies varying degree of intensity of deblocking based on the symbol received.

In a non-limiting embodiment, the decoder deblocks the signal by means of a deblocking method such as that described in U.S. Pat. No. 9,445,131B1, "De-blocking and de-banding filter with adjustable filter strength for video and image processing", which is incorporated by reference herein, wherein the QP information for a given neighbouring area is embedded in the symbol.

In some non-limiting embodiments, the decoder applies the deblocking method in-loop, before applying the residual data decoded from the echelon of data that contains embedded information about blocking impairments. In other non-limiting embodiments, the decoder applies the deblocking method after having combined the preliminary rendition of the signal at the second level of quality with the decoded residual data. In other non-limiting embodiments, the decoder applies said post-processing methods at the end of the decoding process, after having produced a rendition of the signal at the final (e.g., highest) level of quality.

According to other non-limiting embodiments, signal information that is embedded in residual data includes symbols corresponding to banding, ringing and softening impairments. In a non-limiting embodiment, a decoder implements signal enhancement operations that include debanding, deranging, edge enhancement, range equalization and sharpening post processing operations in the area of the signal corresponding to the residual coefficient containing the reserved symbol. For example, a frame of video may be divided into a number of 2 by 2 or 4 by 4 coding unit areas, and the impairment information may be coding unit specific. In other cases, areas of a frame of video may be defined and within each area embedded signalling is provided in one of the set of transformed coefficients for the area (e.g., transformed coefficients for a coding unit in the corner or centre of the area). It should be noted that references to a "frame" of video data also include references to one or more planes of colour data (e.g., luma and chroma planes) as is known from tier-based encoding approaches such as LCEVC and VC-6.

In some non-limiting embodiments, the decoder applies said post-processing methods in-loop, before applying the residual data decoded from the echelon of data that contains embedded information about blocking impairments. In other non-limiting embodiments, the decoder applies said post-processing methods after having combined the preliminary rendition of the signal at the second level of quality with the decoded residual data. In other non-limiting embodiments, the decoder applies said post-processing methods at the end of the decoding process, after having produced a rendition of the signal at the final (e.g. highest) level of quality.

According to certain non-limiting embodiments, impairment information that is embedded in residual data includes symbols corresponding to risk of chroma flip impairments in case of colour conversion from Wide Colour Gamut to Standard Colour Gamut. Said impairments are due to limitations of conversion LUTs ("Look Up Tables"). In a non-limiting embodiment, before applying colour conversion methods, a decoder clamps colour values in the area of the signal corresponding to the residual coefficient containing the reserved symbol.

According to further non-limiting embodiments, impairment information that is embedded in residual data includes symbols corresponding to quantization noise impairments. In some non-limiting embodiments, the decoder applies a denoising method in the area of the signal corresponding to the residual coefficient containing the reserved symbol.

In some non-limiting embodiments, the decoder applies the denoiser in-loop, before applying the residual data decoded from the echelon of data that contains embedded information about blocking impairments. In other non-limiting embodiments, the decoder applies the denoiser after having combined the preliminary rendition of the signal at the second level of quality with the decoded residual data.

According to certain non-limiting embodiments, contextual signal information that is embedded in residual data includes symbols corresponding to loss of film grain and/or camera noise. In some non-limiting embodiments, the decoder applies a statistical dithering method in the area of the signal corresponding to the residual coefficient containing the reserved symbol.

In some non-limiting embodiments, statistical dithering is applied in-loop at multiple levels in a tiered hierarchy, e.g., both at the resolution of the given level of quality and at the resolution of a subsequent (e.g., higher) level of quality.

According to further non-limiting embodiments, contextual signal information relating to impairments is embedded in encoded data generated with a non-hierarchical coding format. In a non-limiting embodiment, the symbols are embedded at macro-block level, using a set of reserved symbols in the quantized coefficients.

Further features and advantages will become apparent from the following description, given by way of example only, which is made with reference to the accompanying drawings.

BRIEF DESCRIPTION OF THE DRAWINGS

FIG. 6 shows a block diagram of an example of an apparatus in accordance with embodiments.

DETAILED DESCRIPTION

Figure 1:
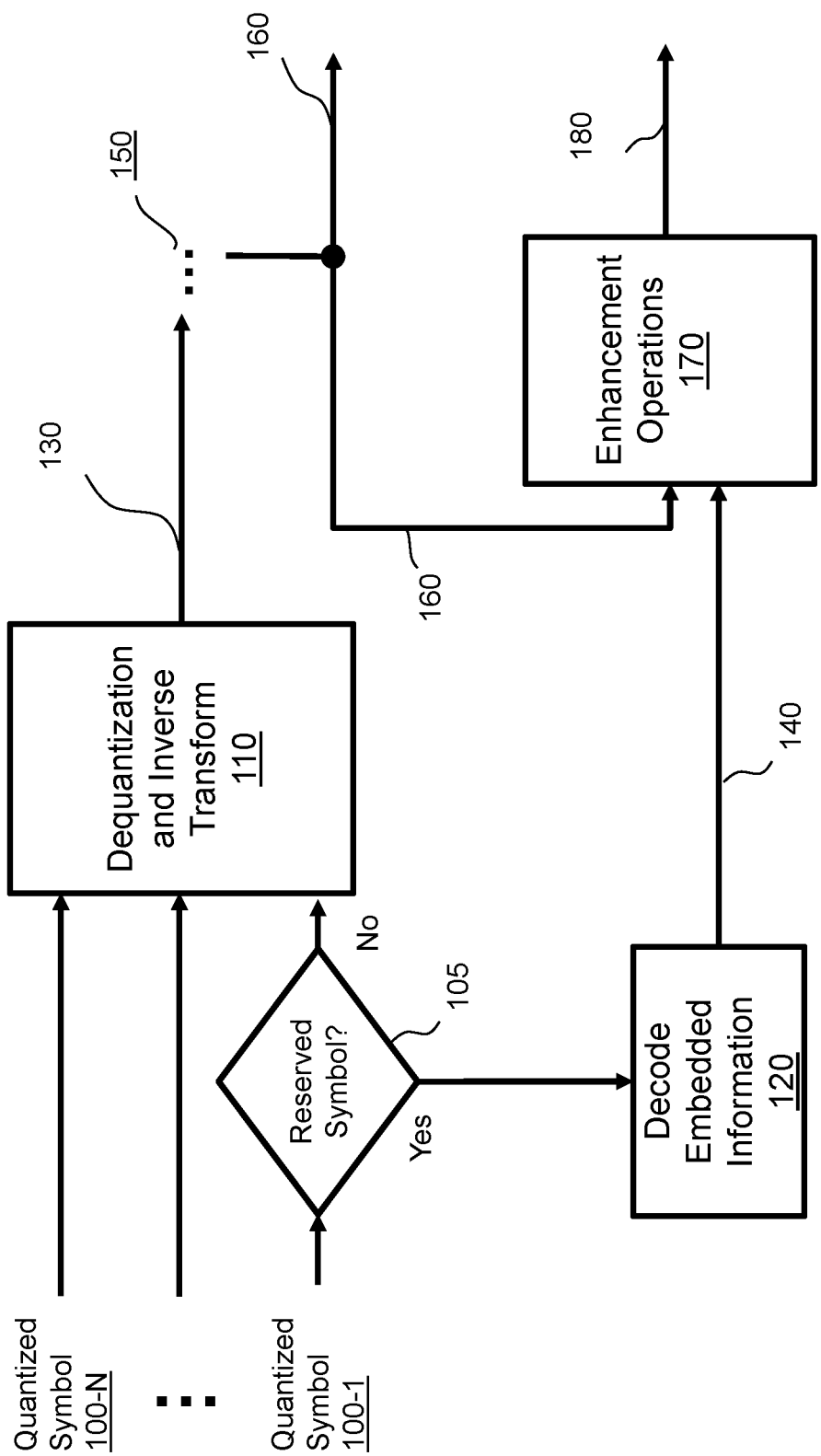
FIG. 1 shows a block diagram of an example of a decoding system in accordance with embodiments.

As additional background, based on the fidelity of the predicted rendition of a given Level of Quality (LoQ), a signal may require a varying amount of correction, which may be provided by "residual data", or simply "residuals". This residual data, for example as taught in both LCEVC and VC-6, enables a decoder to generate a reconstruction of the signal at the given LoQ that best resembles (or even losslessly reconstructs) the original. Especially when a lower LoQ is reconstructed using relatively high compression ratios and/or less efficient coding formats, certain impairments may be generated at the lower LoQ. The approaches of tier-based encoding schemes such as LCEVC and VC-6 means that the residual data may operate as per the scheme to correct these impairments. However, when there are constraints on bit rate, it has been found that additional signal enhancement operations may be applied to enhance picture quality within a reconstruction of the final signal at full resolution and quality. In examples described herein, at least the potential for impairments is detected at an encoder, and signalled to a decoder using embedded signalling such that a decoder may maintain a standardised decoding procedure, but add additional signal enhancement operations that are performed selectively based on the content of the embedded signalling to reduce and/or correct the impairments in the output reconstruction at the decoder. For the case of images and video signals, non-limiting examples of impairments that may be corrected include blocking, banding, softening, chroma impairments due to colour-space conversion, loss of low contrast texture, quantization noise, loss of film grain noise, etc.

Certain methods described herein allow impairments to be dealt with in two ways at the decoder: by directly correcting them with suitable residual data (e.g., up to lossless correction and reconstruction), and by applying postprocessing operations such as sharpening, denoising, image enhancement, etc. As impairments may be signalled in contextual data that is carried within localised coding units or blocks, localised signal enhancement operations may also be signalled, allowing for more efficient encoding, decoding and correction than comparative "blanket" approaches that apply unselective global postprocessing. As a comparison, with regards to correcting impairments via residual data alone, although the approach can work up to lossless fidelity, suitably correcting artefacts such as blocking or banding is typically extremely costly in terms of bitrate, as it requires extremely small quantization steps. On the other hand, with regards to postprocessing operations at the end of the decoding process, it is typically extremely costly from a decoding processing point of view to properly identify to what degree they should be used in order to avoid corrupting parts of the signals that do not benefit from them. In the present case, a combination of some correction via residual data and signalled signal enhancement operations allows more efficient residual encoding with larger quantization steps and simple and efficient selective and possibly localised correction based on impairments signalled from the encoder within the residual data (e.g. in addition to and separate from the residual data itself)

Embodiments described herein allow to the efficient generation, signalling and leverage of contextual information that can be used by the decoder—along with residual data—to suitably amend the signal reconstruction in order to improve the quality of the reconstructed signal. Such information is efficiently embedded in the coefficients of residual data for one or more echelons of the coded signal, allowing to avoid the need for additional signalling overhead (e.g., separate sideband signalling) as well as to efficiently discriminate the cases that can benefit from a range of quality-enhancement operations. In addition, for some non-limiting embodiments described herein, the application of certain non-essential signal enhancement operations at lower signal resolutions within the context of a hierarchical coding scheme also generates material reductions of required processing power at the decoder device.

Referring to FIG. 1, there is shown an example of method implemented within a decoding system. A set of quantized symbols 100-1 to 100-N are received and processed. These quantized symbols comprise quantized transformed coefficients, where quantization may be optional and/or varied in degree based on encoding configurations. The quantized symbols may comprise the symbols that result from one or more of the encoded streams described with respect to later Figures. In examples described herein, information is embedded in one or more values received in one or more encoded data layers wherein said values are associated with transformed coefficients intended to be processed by a decoder for deriving elements of the signal. Receipt of example quantized and transformed coefficient symbols is described in LCEVC and VC-6. Depending on whether symbol 100-1 is to be intended as reserved symbol, the decoder follows two different approaches. In this case, the term "reserved symbol" may be considered to refer to a symbol that is reserved to carry contextual information, such as impairment information including instructions regarding signal enhancement operations to be performed at the decoder to reduce and/or remove particular detected impairments.

If symbol 100-1 is not to be intended as reserved symbol, e.g. is intended to carry residual data for use in reconstructing the signal, its decoding follows the normal process implemented for the other symbols in the set: dequantization and reverse transform according to block 110, producing a set of decoded data 130. Said decoded data is further processed by means of Decoding Operations 150 to produce Decoded Signal 160. For example, this normal process may be a process described in a decoding specification such as LCEVC or VC-6.

If symbol 100-1 is to be intended as reserved symbol, its decoding follows a different process as indicated by Comparison block 105. At block 120, the embedded information is decoded by processing symbol 100-1 to produce Information on Enhancement Operations to Perform 140. This Information 140 is impairment information as it signals information about impairments detected at the decoder. The decoded signal 160 is processed along with the Information on Enhancement Operations to Perform 140 by means of Enhancement Operations 170, producing Enhanced Reconstruction of the Signal 180.

For example, the Information on Enhancement Operations to Perform 140 may be determined based on embedded signalling information corresponds to one or more of the following classes of impairments: banding, ringing, softening, colour conversion flips and quantization noise impairments. The Enhancement Operations 170 may correspondingly comprise one or more of the following: deblocking, debanding, deringing, denoising, sharpening, dithering, colour clipping, range equalization, and edge enhancement. Impairments may be detected by computing image quality metrics at the encoder, e.g. using known metrics to detect impairments.

In some non-limiting embodiments, a bit in the decoded bit or bytestream (not shown in the figure) signals to the decoder that symbol 100-1 is to be intended as reserved symbol. For example, this bit may comprise a "user data" flag that is switched "on" or "off" in global configuration information as described in more detail later below.

In some non-limiting embodiments, the decoder implements signal enhancement operations in a different way (including at times not implementing them at all) based on the processing power available at the decoder device at a time of processing. For example, even if Information on Enhancement Operations to Perform 140 as derived from embedded signalling regarding impairments instructs Enhancement Operations 170, these may not be performed if a resource metric at the decoder is below a predefined threshold. For example, Enhancement Operations 170 may only be performed if there is enough spare Central Processing Unit (CPU) or Graphical Processing Unit (GPU) capacity (e.g., as measured in terms of one or more of utilization, throughput, available memory etc.) and/or if, for a mobile device, remaining battery power is above a predefined threshold (e.g., 20%).

Figure 2:
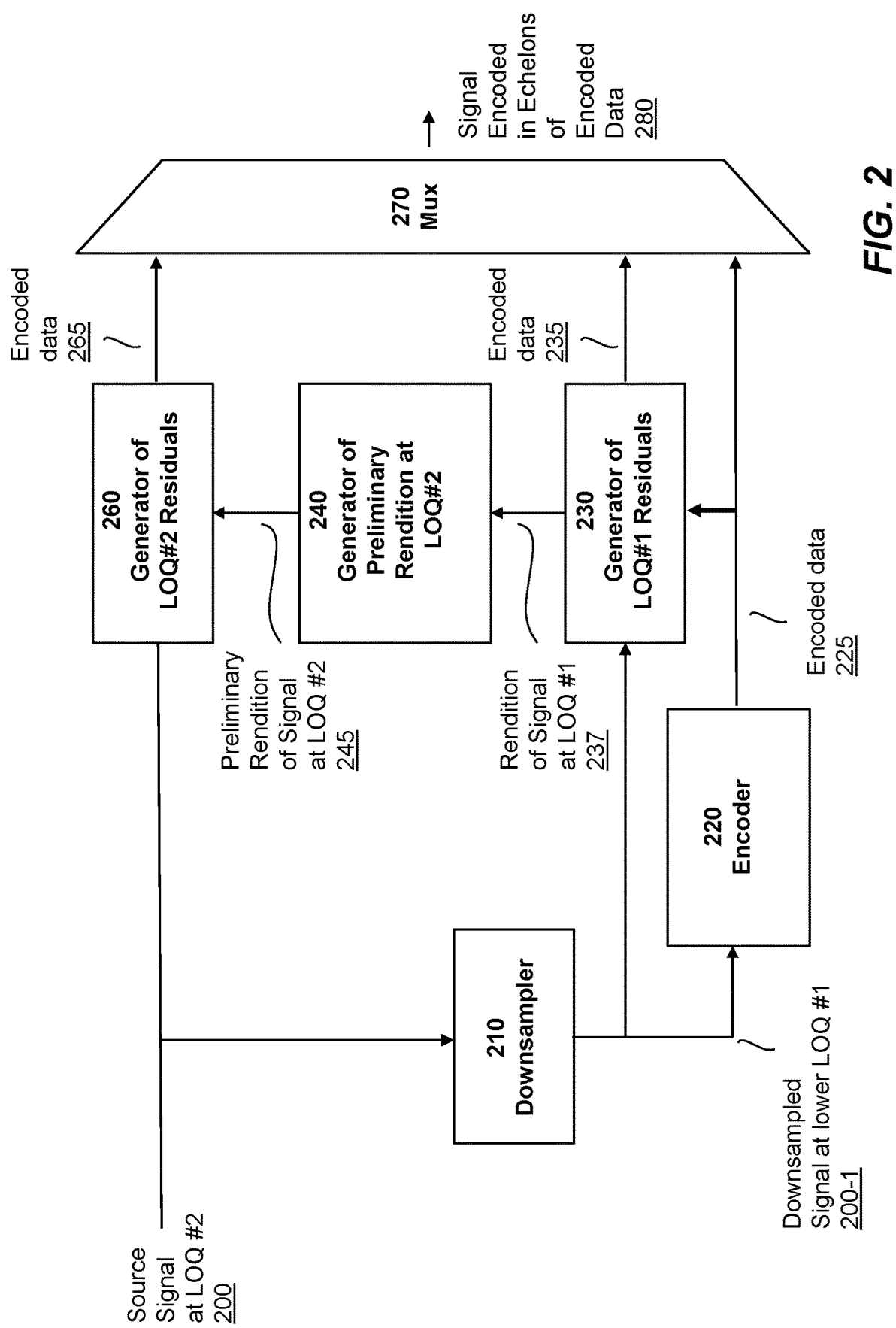
FIG. 2 shows a block diagram of an example of a hierarchical encoding system in accordance with embodiments.

Referring to FIG. 2, there is shown an example of a method implemented within an encoding system, in this case implementing a tier-based hierarchical coding method. The blocks in FIG. 2 may be implemented by an example encoder. A source signal 200 at Level of Quality #2 (e.g., full resolution and quality) is received and processed by Downsampler 210, producing Downsampled Signal 200-1. Downsampled Signal 200-1 is processed by Encoder 220, which applies a given encoding method (in some non-limiting embodiments also a tier-based hierarchical coding method, while in other non-limiting embodiments a non-hierarchical coding method), producing Encoded Data 225. The Encoder 220 may be referred to as a "base" decoder.

Encoded data 225 and Downsampled Signal 200-1 are processed by a Generator of LOQ #1 Residual Data 230 to produce Encoded Data 235 and a Rendition of Signal at LOQ #1 237. The Generator of LOQ #1 Residual Data 230 may generate a residual signal by subtracting a reconstruction based on the Encoded Data 225 from the Downsampled Signal 200-1. The Generator of LOQ #1 Residual Data 230 may also encode said residual signal by applying a coding unit transformation and quantizing the output of that transformation. A further stage of entropy encoding may also be applied. The output of the transformation and the quantization may comprise the (quantized) transformed coefficients that are modified to include embedded signalling.

Rendition of Signal at LOQ #1 237 is further processed by a Generator of a Preliminary Rendition at LOQ #2 240 to produce a Preliminary Rendition of Signal at LOQ #2 245. For example, this may comprise upsampling the Rendition of Signal at LOQ #1 237 with optional modifications to generate a signal at the resolution and/or sampling rate of LOQ #2.

The Preliminary Rendition of Signal at LOQ #2 245 is processed along with Source Signal 200 by a Generator of LOQ #2 Residuals 260 to produce Encoded Data 265. The Encoded Data 265 may comprise a residual signal that is generated by the Generator of LOQ #2 Residuals 260 by subtracting the Preliminary Rendition of Signal at LOQ #2 from the Source Signal 200. The Generator of LOQ #2 Residuals 260 may apply similar operations to the Generator of LOQ #1 230, but upon a residual signal at the second level of quality (e.g., at a higher resolution).

Sets of Encoded Data 225, 235 and 265 are then processed by a Multiplexer (Mux) 270 to produce Signal Encoded in Echelons of Encoded Data 280. Although all three sets of Encoded Data are multiplexed in FIG. 2, in other examples subsets may be multiplexed, e.g. Encoded Data 235 and 265 may be transmitted separately from Encoded Data 225. In VC-6, an encoded data stream may comprise all the sets of Encoded Data 225, 235, 265; in LCEVC, an encoded (enhancement) data stream may comprise Encoded Data 235 and 265 and Encoded Data 225 may form a separate base stream.

In certain described embodiments, when detecting that the process of encoding the signal at the first level of quality produced one or more impairments that cannot be suitably corrected with residual data at the target bitrate, Generator of LOQ #1 Residuals 230 produces Encoded Data 235 that leverages a set of reserved symbols in that data to signal to the decoder the type and/or the location of the impairments that it should expect. For example, the Generator of LOQ #1 Residuals 230 may process one or more of a reconstruction from encoded data 225 and a residual signal to determine one or more impairments that are present. This may comprise computing one or more image metrics on one or more frames of the signals. In one case, the Generator of LOQ #1 Residuals 230 replaces quantization transformed coefficient values for a particular transformation coefficient (e.g., a particular element in a vector generated by multiplying by a transformation matrix) with embedded signalling data. Only values for one coefficient may be modified, the other coefficients may be left unmodified and encoded as per a comparative encoding for a standardised decoding procedure. A coefficient may be selected that minimises changes to the reconstructed signal, such as a H or HH coefficient for a 2 by 2 or 4 by 4 Hadamard transform.

In some non-limiting embodiments, the Generator of LOQ #1 Residuals 230 toggles a specific bit in the encoded bit or bytestream in order to signal to the decoder whether a given set of symbols in set of encoded data 235 should be interpreted as actual residual data or as additional contextual information to inform signal enhancement operations.

In some non-limiting embodiments, the Generator of LOQ #1 Residuals 230 and the Generator of LOQ #2 Residuals 260 implement in-loop signal enhancement operations according to the information signalled with reserved coefficients, in order to simulate the reconstruction produced by the decoder and suitably adapt, if necessary, Encoded Data 265. For example, residuals that are generated by Generator of LOQ #2 Residuals 260 and encoded as Encoded Data 265 may correct for the replacement of the transformed coefficient values with the embedded impairment signalling.

Figure 3:
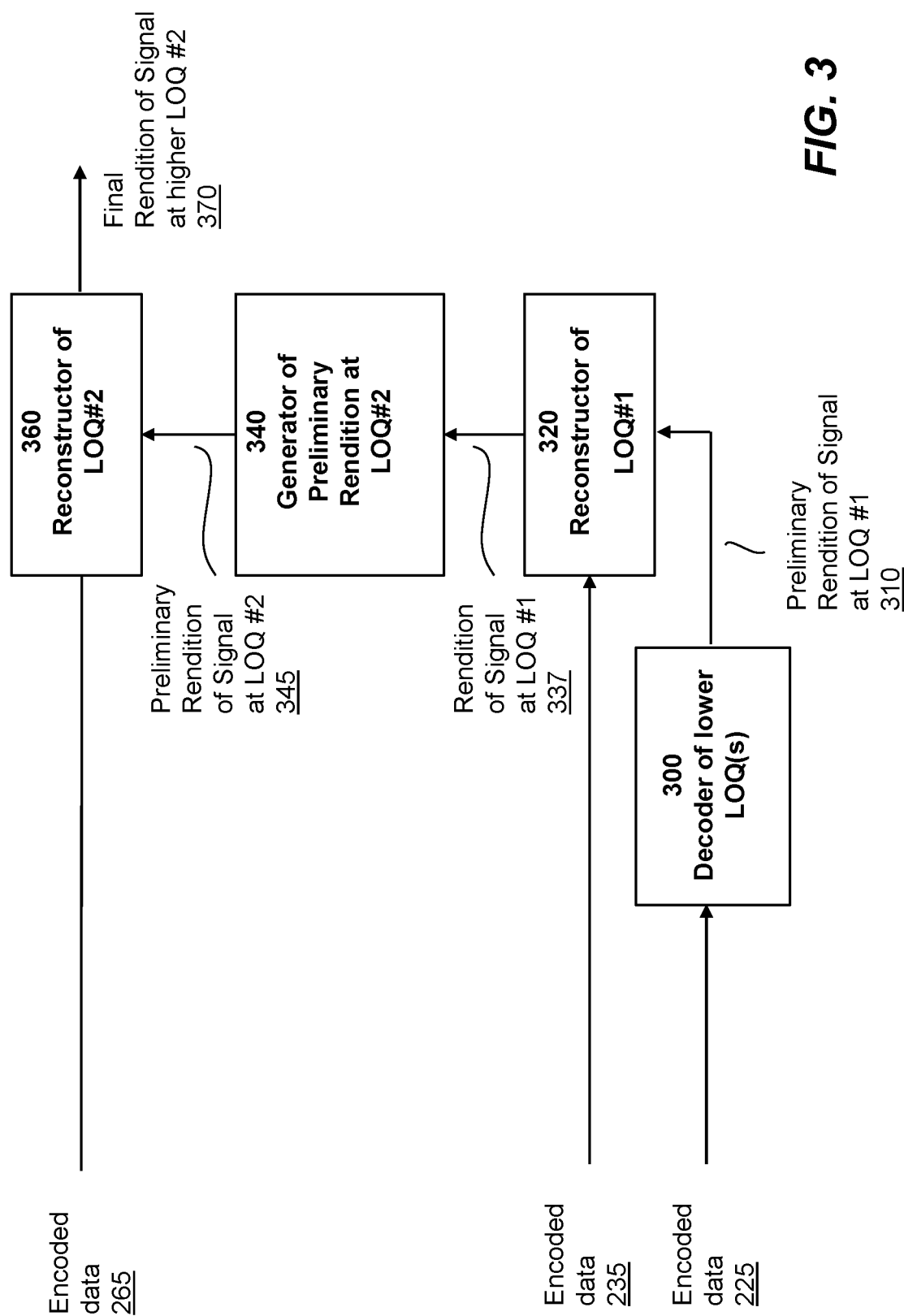
FIG. 3 shows a block diagram of a hierarchical decoding system in accordance with embodiments.

Referring to FIG. 3, there is shown an example of method implemented within a decoding system, also implementing a tier-based hierarchical coding method. The blocks in FIG. 3 may be implemented by an example decoder. Encoded Data 225 is received and processed by Decoder of Lower LOQ(s) 300. The Encoded Data 225 may be obtained by demultiplexing the Signal Encoded in Echelons of Encoded Data 280 that is received from an encoder, such as that shown in FIG. 2. The Decoder of Lower LOQ(s) 300 may be referred to as a base decoder. The Decoder of Lower LOQ(s) 300 outputs a Preliminary Rendition of Signal at LOQ #1 310.

The Preliminary Rendition of Signal at LOQ #1 310 is then processed together with Encoded Data 235 by a Reconstructor of LOQ #1 320 in order to produce Rendition of Signal at LOQ #1 337. The Encoded Data 235 may be obtained by demultiplexing the Signal Encoded in Echelons of Encoded Data 280 that is received from an encoder, such as that shown in FIG. 2. In some non-limiting embodiments, Rendition 337 is identical to corresponding Rendition 237 of FIG. 2. In other non-limiting embodiments, the decoder applies different processing methods (e.g., including signal enhancement operations), producing a Rendition 337 different from Rendition 237. The Encoded Data 235 may be decoded by the Reconstructor of LOQ #1 320 and then combined with the Preliminary Rendition of Signal at LOQ #1 310. In one case, the Encoded Data 235 may comprise residual data as described in other examples herein. Decoding may comprise applying operations as indicated by blocks 110 and 410 in FIGS. 1 and 4.

Rendition of Signal at LOQ #1 337 is then processed by a Generator of Preliminary Rendition at LOQ #2 340 (which may correspond to the Generator of Preliminary Rendition at LOQ #2 240 in FIG. 2) to produce Preliminary Rendition of Signal at LOQ #2 345. In some non-limiting embodiments, Rendition 345 is identical to corresponding Rendition 245 of FIG. 2. In other non-limiting embodiments, the decoder produces a Rendition 337 different from Rendition 237, and consequently also Rendition 345 is different from Rendition 245.

The Preliminary Rendition of Signal at LOQ #2 345 is processed by a Reconstructor of LOQ #2 360, producing a Final Rendition of Signal at LOQ #2 370.

In some non-limiting embodiments, when decoding a specific set of data within Encoded Data 235 and finding a specific set of quantized symbols, the decoder does not interpret said symbols as residual data, but instead performs signal-enhancement operations according to the received symbols.

In some non-limiting embodiments, a bit in the decoded bytestream (not shown in FIG. 3) signals to Reconstructor of LOQ #1 320 and/or Reconstructor of LOQ #2 360 that additional information may have been embedded in some residual data coefficients, and more specifically that a specific set of quantized symbols in a specific set of residual data (or portions of said symbols) should not be interpreted as actual residual data, but as contextual information to inform signal enhancement operations.

In a non-limiting embodiment, some reserved symbols correspond to specific types of impairments, informing the decoder on postprocessing operations (whether in loop—i.e., within block 230—or at the end of the decoding process—i.e., within block 260) that may be applied to a corresponding area of the signal in order to improve the quality of the Final Rendition of Signal at LOQ #2 370.

In some non-limiting embodiments, the decoder implements signal enhancement operations in a different way (including at times not implementing them at all) based on the processing power available at the decoder device at the time of decoding.

In some non-limiting embodiments, the decoder applies the signal enhancement methods in-loop (i.e., within block 320), before applying the residual data decoded from the echelon of data that contains embedded information about blocking impairments. In other non-limiting embodiments, the decoder applies the signal enhancement methods in-loop (i.e., still within block 320) after having combined the preliminary rendition of the signal with the decoded residual data. In other non-limiting embodiments, the decoder applies the signal enhancement methods at the end of the decoding process (i.e., at the end of or after block 360), after having produced a rendition of the signal at the final (highest) level of quality. In yet other non-limiting embodiments, the decoder applies signal enhancement methods both in-loop (e.g., by means of non-limiting example according to one of the above-mentioned alternatives) and at the end of the decoding process.

In preferred examples, the encoders or decoders are part of a tier-based hierarchical coding scheme or format. Examples of a tier-based hierarchical coding scheme include LCEVC: MPEG-5 Part 2 LCEVC ("Low Complexity Enhancement Video Coding") and VC-6: SMPTE VC-6 ST-2117, the former being described in PCT/GB2020/050695 (and the associated standard document) and the latter being described in PCT/GB2018/053552 (and the associated standard document), all of which are incorporated by reference herein. However, the concepts illustrated herein need not be limited to these specific hierarchical coding schemes. Those skilled in the art will be aware of how the above described encoder and decoder methods apply to the base and enhancement layers in LCEVC (e.g., LOQ #1 corresponds to the base layer and LOQ #2 corresponds to the enhancement layer). As such, in certain cases, the format in which Encoded Data 235, Encoded Data 265 and the corresponding embedded contextual information are encoded is MPEG-5 Part 2 LCEVC ("Low Complexity Enhancement Video Coding"). In this case, the encoded data 235 and the encoded data 265 may comprise different enhancement sub-layers. In this case, the embedded contextual information may be referred to as "user data", as it may comprise information that falls outside of the data needed to reconstruct the signal according to the standard. In other cases, the format in which encoded data 235, encoded data 265 and the corresponding embedded contextual information are encoded is SMPTE VC-6 ST-2117. Similarly, the embedded contextual information may comprise data that is not required to reconstruct the signal according to the definition of the standard.

Figure 4:
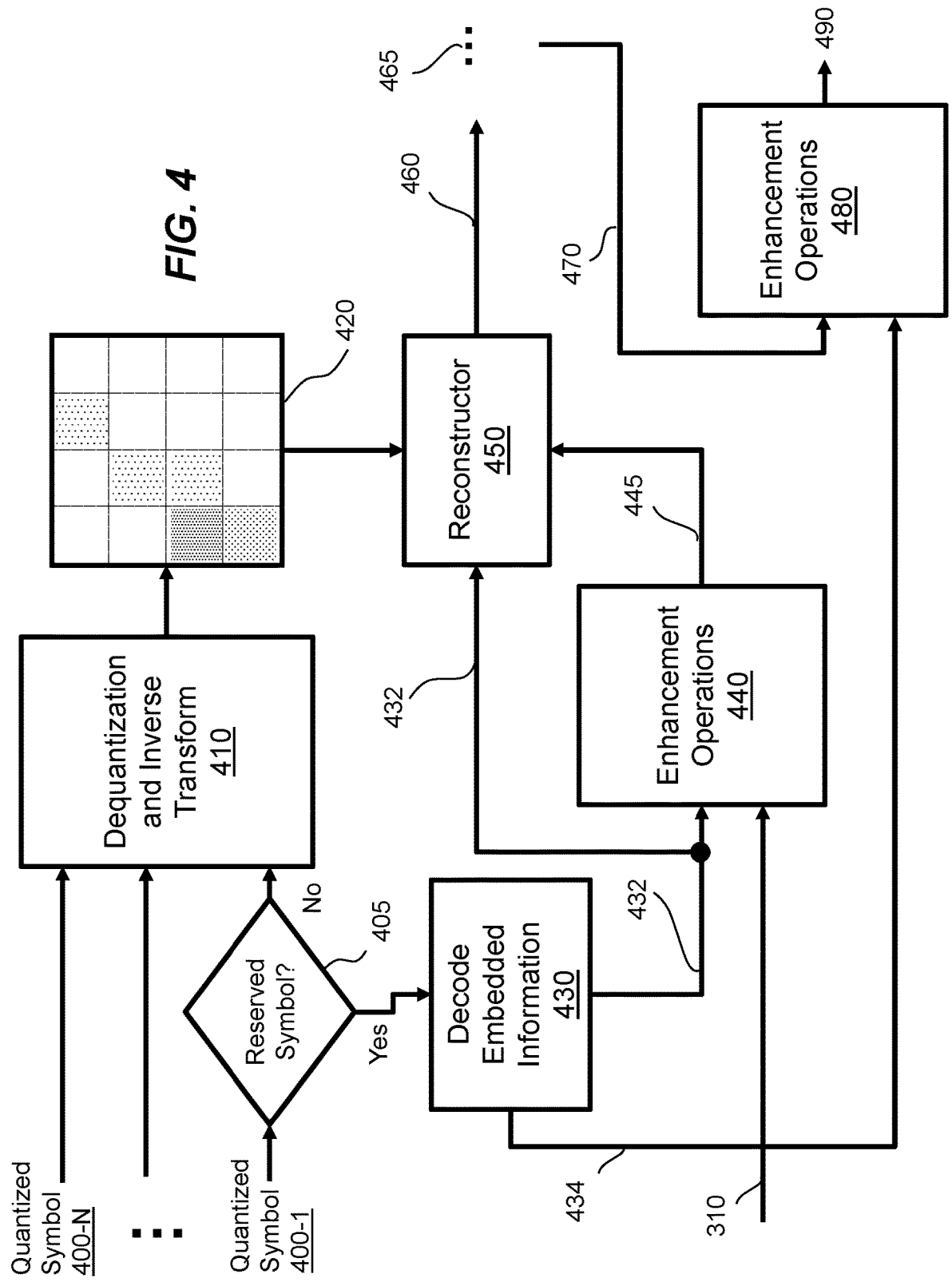
FIG. 4 shows a block diagram of another example of a hierarchical decoding system in accordance with embodiments.

Referring to FIG. 4, there is shown an example of a method implemented within a decoding system, that implements a tier-based hierarchical coding method. The method is a variation of that shown in FIG. 2. In this variation impairment information may be used to process one or more of a Preliminary Rendition of Signal at LOQ #1 (such as 310 from FIG. 3) and a Rendition of Signal at LOQ #2 (such as 370 from FIG. 3). As such the impairment information may be associated with one or more levels of quality, including a base level of quality.

As shown in FIG. 2, in FIG. 4, quantized symbol 400-1 is received and processed along with other quantized symbols 400-2 . . . 400-N. The quantized symbols may represent a residual data stream at the level of Encoded Data 235. The decoder checks whether symbol 400-1 should be intended as a reserved symbol. Depending on whether symbol 400-1 is to be intended as reserved symbol, the decoder follows two different approaches.

If symbol 400-1 is not to be intended as reserved symbol, its decoding follows the normal process implemented for the other symbols in the set: Dequantization and Inverse Transform according to block 410, producing a set of decoded Residual Data 420. Said residual data is further processed by means of Reconstructor 450 (e.g., by way of non-limiting embodiment, along with other residual data for the rest of the sample of the signal) to produce Rendition of Signal at LOQ #1 460.

If symbol 400-1 is to be intended as reserved symbol, its decoding follows a different process. At block 430, a Decode Embedded Info 430 operation is initiated to process symbol 400-1. In this example, the signalling present in symbol 400-1 is decoded to produce Information on Enhancement Operations to Perform for one or more levels of quality. A First Set of Information on Enhancement Operations to Perform 432 is decoded and is processed along with a Preliminary Rendition of Signal at LOQ #1 310 by means of Enhancement Operations 440, producing Enhanced Preliminary Rendition of Signal at LOQ #1 445. In this case, the First Set of Information on Enhancement Operations to Perform 432 indicates signal enhancement operations to perform on a signal decoded from Encoded Data 225 in FIG. 3. This may be an output of a base decoder for an LCEVC implementation. The Enhancement Operations 440 take place at the first level of quality prior to the addition of residual data. The Enhanced Preliminary Rendition 445 is then further processed by Reconstructor 450 along with Residual Data 420, producing Enhanced Rendition of Signal at LOQ #1 460. For example, the Reconstructor 450 may comprise processes similar to those performed by the Reconstructor of LOQ #1 320 in FIG. 3, and the Enhanced Rendition of Signal at LOQ #1 460 may correspond to the Rendition of Signal at LOQ #1 337 in FIG. 3. As shown in FIG. 4, in certain cases the First Set of Information on Enhancement Operations to Perform 432 may also be used by the Reconstructor 450 to provide differential processing. For example, in certain examples, Enhancement Operations 440 may be performed after the addition of Residual Data 420 based on the First Set of Information on Enhancement Operations to Perform 432. Different approaches may be applied depending on the implementation.

In one case, the Decode Embedded Information block 430 may extract both impairment information and residual data from the quantized symbol 400-1, e.g. the quantized symbol 400-1 may carry both impairment information and residual data. This for example may be achieved by partitioning the bits of the quantized symbol 400-1 and applying a higher level of quantization to the original symbol representing the transformed coefficients for the residual data. This may be achieved by extracting the least significant bits of the symbol and then setting these bits to zero, representing a downwards rounding operation where the level of rounding is to the nearest $2^n$ where n is the number of bits used for the signalling information. For the bits representing the transformed coefficient data, the Decode Embedded Information block 430 may perform operations similar to the Dequantization and Inverse Transform block 410 or may alternatively pass a non-signalling component of the quantized symbol 400-1 back to Dequantization and Inverse Transform block 410 to derive the residual data. In any case, the Reconstructor 450 may additionally receive residual data for the quantized symbol 400-1.

The Reconstructor 450 thus generates the Enhanced Rendition of Signal at LOQ #1 460, which is further processed by Decoding Operations 465 to produce the Rendition of Signal at LOQ #2 470. The Decoding Operations 465 may be the operations associated with the Generator of Preliminary Rendition at LOQ #2 340 and the Reconstructor of LOQ #2 360 in FIG. 2. Hence, the Rendition of Signal at LOQ #2 470 may be seen to correspond to Rendition 370 in FIG. 3. In FIG. 4, a Second Set of Information on Enhancement Operations to Perform 434 is decoded by block 430 and is used to instruct Enhancement Operations 480 that are performed at the second level of quality. Hence, in FIG. 4, the Rendition of Signal at LOQ #2 470 is processed by Enhancement Operations 480 along with Information on Enhancement Operations to Perform 434 in order to produce Enhanced Final Rendition of signal at LOQ #2 490.

In the example of FIG. 4, there are two sets of Information on Enhancement Operations to Perform 432, 434 and three locations where Enhancement Operations may be performed 440, 450 and 480. Different implementations may use different combinations of this described signalling and enhancement, e.g. in one case only the First Set of Information on Enhancement Operations to Perform 432 may be sent and only the Enhancement Operations 440 may be performed; in another case, only the Second Set of Information on Enhancement Operations to Perform 434 may be sent and only the Enhancement Operations 480 may be performed. In one case, the embedded signalling may indicate whether one or more of the Enhancement Operations 440 and 480 are activated and are to be performed. For example, this may be indicated in global signalling data. This global signalling data may be embedded within initial coding blocks of the signal and/or within separate sideband signalling for a picture or set of pictures.

In certain cases, if the quantized symbol 400-1 still carries transformed coefficient values (e.g., by splitting bit capacity between the impairment information and the transformed coefficient values) and/or the transformed coefficient is selected as a coefficient from a larger (e.g., 4 by 4) transform that is found to have reduced visual impact (e.g., an HH coefficient in a 4 by 4 Hadamard transform) then the visual impact on the resulting output signal (e.g., the Final Rendition of signal at LOQ #2 490) is minimised. Additionally, if the transformed coefficient values has reduced accuracy or are replaced at the LOQ #1 level, then the Generator of LOQ #2 Residuals 260 is able to generate residual data that becomes Encoded Data 265 that corrects for the difference between the Preliminary Rendition of Signal at LOQ #2 245 and the Source Signal at LOQ #2 200. This thus means that the visual effect of the embedded signalling is minimised, while ensuring that the encoding process does not modify the embedded signalling (as information is embedded prior to entropy encoding but after transformation and quantization). Even if there is a minimal or small effect on visual quality, e.g. if the embedded signalling replaces values for transformed coefficients, this effect may be smaller than the perceptive improvements in picture quality that are obtained with the signalled enhancement operations; hence, there may be improved overall picture quality at constrained bit rates (e.g., over poor quality communication channels and/or when constrained to use low quality base coding).

Figure 5:
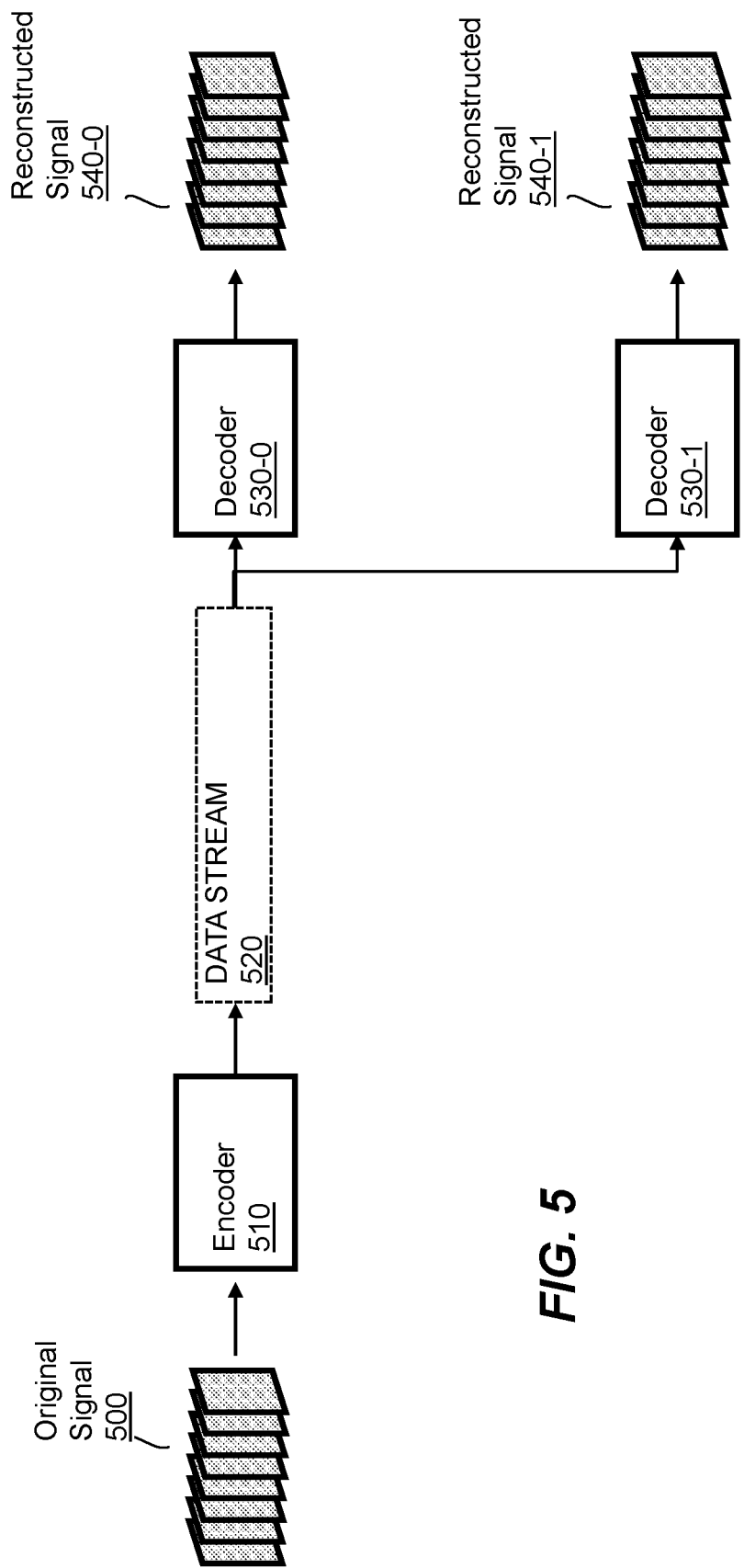
FIG. 5 shows a block diagram of another example of encoding and decoding system in accordance with embodiments.

Referring to FIG. 5, there is shown an example of method implemented within an encoding and decoding system leveraging innovative methods described herein. Encoder 510 processes Original Signal 500 to produce Data Stream 520. The Encoder 510 may encode the Data Stream 520 as explained with reference to FIG. 2 and may embed impairment information within one or more values received in one or more encoded data layers transmitted within the Data Stream 520, wherein said values are associated with transformed coefficients intended to be processed by a decoder for deriving elements of the signal, e.g. as described with respect to either FIG. 2 or FIG. 4.

Data Stream 520 is processed by two decoders. Decoder 530-0 implements signal enhancement methods according to information signalled by Encoder 510 within reserved symbols, decoding Reconstructed Signal 540-0. Decoder 530-1 ignores information signalled by Encoder 510 within reserved symbols, and reconstructs Reconstructed Signal 540-1. For example, the Decoder 530-1 may process the embedded signalling values as if they were values for the transformed coefficients, may ignore these values (e.g. set them to 0) and/or may perform within standard user data processing (e.g. for LCEVC) but subsequently ignore the user data that contains embedded signalling. In some non-limiting embodiments, Reconstructed Signal 540-1 is a perfectly viable reconstruction of the signal for the given purposes, making the enhancement operations performed by Decoder 530-0 entirely optional. For example, the Decoder 530-1 may be a decoder that applies the decoding process set out in the LCEVC standard, whereas the Decoder 530-0 may be a decoder that implements an out-of-standard decoding process (in certain cases, in addition to the decoding process set out in the LCEVC standard). Hence, additional functionality may be provided based on the impairment information while maintaining compliance with the LCEVC standard.

In some non-limiting embodiments Decoder 530-0 may at times decide to ignore part of the information signalled by Encoder 510 within reserved symbols. In a non-limiting embodiment, Decoder 530-0 defines whether or not to ignore part of the information signalled within reserved symbols based on information that includes resolution and framerate of the signal, processing power load at the time of decoding and battery power status.

In certain cases, backwards compatibility, e.g. as explained above, is achieved because the Decoder 530-1 treats the reserved symbols as normal quantized transformed coefficient values and decodes them appropriately. Corrections applied within a tier-based hierarchical format mean that any errors may be corrected. Alternatively, a bit in the encoded Data Stream 520 is used to signal to the Decoders 530 that one or more values should be interpreted as said information rather than actual quantized values of transformed coefficients. In yet another case, a bit depth assigned to a particular transformed coefficient value (e.g. a depth D is 8 or 16 bits) may be shared between the reserved symbols and the (quantized) transformed coefficient values. For example, the n least significant bits of the transformed coefficient values (where n is less than the bit depth, e.g. is 2 or 6 bits) may be used to carry the reserved symbol (i.e. the impairment information), which represents a more aggressive quantization applied to the transformed coefficient values that carry this symbol but that still enables a coarse level of information (the D-n bits) to be transmitted and used to reconstruct the residual data. Visual impact may be further minimised by selecting a transformed coefficient that is determined (e.g., by experiment) to be less perceptive in a reconstructed output (e.g. H or HH in a 2 by 2 or 4 by 4 Hadamard transform).

Referring to FIG. 6, there is shown a schematic block diagram of an example of an apparatus 600.

Examples of the apparatus 600 include, but are not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, mobile device, video game console, handheld video game device, a peripheral device such as a switch, modem, router, a vehicle etc., or in general any type of computing or electronic device.

In this example, the apparatus 600 comprises one or more processors 612 configured to process information and/or instructions. The one or more processors 612 may comprise a central processing unit (CPU). The one or more processors 612 are coupled with a bus 611. Operations performed by the one or more processors 612 may be carried out by hardware and/or software. The one or more processors 612 may comprise multiple co-located processors or multiple disparately located processors.

In this example, the apparatus 600 comprises computer-useable memory 613 configured to store information and/or instructions for the one or more processors 612. The computer-useable memory 613 is coupled with the bus 611. The computer-useable memory 613 may comprise one or more of volatile and non-volatile memory. The volatile memory may comprise random access memory (RAM). The non-volatile memory may comprise read-only memory (ROM).

In this example, the apparatus 600 comprises one or more external data-storage units 680 configured to store information and/or instructions. The one or more external data-storage units 680 are coupled with the apparatus 600 via an I/O interface 614. The one or more data-storage units 680 may for example comprise a magnetic or optical disk and disk drive or a solid-state drive (SSD).

In this example, the apparatus 600 further comprises one or more input/output (I/O) devices 616 coupled via the I/O interface 614 configured to communicate information to and/or from the one or more processors 612. The apparatus 600 also comprises at least one network interface 617. Both the I/O interface 614 and the network interface 617 are coupled to the systems bus 611. The at least one network interface may enable the apparatus 600 to communicate via one or more data communications networks 690. Examples of data communications networks include, but are not limited to, the Internet and a Local Area Network (LAN). The one or more I/O devices 616 may enable a user to provide input to the apparatus 800 via one or more input devices (not shown). The one or more I/O devices 806 may enable information to be provided to a user via one or more output devices (not shown).

In FIG. 6, a (signal) processor application 640-2 is shown loaded into the memory 1513. This may be executed as a (signal) processor process 640-1 by the processor 612 to implement the methods described herein (e.g. to implement suitable encoders or decoders). The apparatus 600 may also comprise additional features that are not shown for clarity, including an operating system and additional data processing modules. The (signal) processor process 640-1 may be implemented by way of computer program code stored in memory locations within the computer-usable non-volatile memory, computer-readable storage media within the one or more data-storage units and/or other tangible computer-readable storage media. Examples of tangible computer-readable storage media include, but are not limited to, an optical medium (e.g., CD-ROM, DVD-ROM or Blu-ray), flash memory card, floppy or hard disk or any other medium capable of storing computer-readable instructions such as firmware or microcode in at least one ROM or RAM or Programmable ROM (PROM) chips or as an Application Specific Integrated Circuit (ASIC).

The apparatus 600 may therefore comprise a data processing module which can be executed by the one or more processors. The data processing module can be configured to include instructions to implement at least some of the operations described herein. During operation, the one or more processors launch, run, execute, interpret or otherwise perform the instructions.

Although at least some aspects of the examples described herein with reference to the drawings comprise computer processes performed in processing systems or processors, examples described herein also extend to computer programs, for example computer programs on or in a carrier, adapted for putting the examples into practice. The carrier may be any entity or device capable of carrying the program. It will be appreciated that the apparatus 600 may comprise more, fewer and/or different components from those depicted in FIG. 6. The apparatus 600 may be located in a single location or may be distributed in multiple locations. Such locations may be local or remote.

The techniques described herein may be implemented in software or hardware, or may be implemented using a combination of software and hardware. They may include configuring an apparatus to carry out and/or support any or all of techniques described herein.

As described in examples herein, a signal processor (e.g., computer processor hardware) is configured to receive data and decode it ("decoder"). The decoder obtains a rendition of the signal at a first (lower) level of quality and detects reserved symbols specifying impairment information. The decoder reconstructs a rendition of the signal at the second (next higher) level of quality and may apply further processing on the rendition using the impairment information, such as signal enhancement operations that are instructed by way of the impairment information.

In certain examples described here, reserved symbols may be carried as so-called user data of an encoded data stream. In these examples, signal processing information is embedded in one or more values received in one or more encoded data layers transmitted within the stream of encoded data. The values are associated with transformed coefficients that are processed to derive elements of the signal during the decoding, e.g. they may comprise values for a predefined transformed coefficient within a set of different transformed coefficients that are generated by an encoding transform.

A bit in a bitstream for the encoded data stream may be used to signal the presence of user data. The bit may comprise a user_data_enabled bit, which may be present in a global configuration header for the encoded data stream. In certain examples, an encoding of user data in place of one of the coefficients may be configured as follows. If the bit is set to "0", then the decoder interprets that data as the relevant transform coefficient. If the bit is set to "1", then the data contained in the relevant coefficient is deemed to be user data, and the decoder is configured to ignore that data, or the relevant coefficient is deemed to carry user data and relevant processes to extract that data is performed. For example, if the bit is set to "1" this may indicate impairment information is being transmitted.

User data transmitted in this manner may be useful to enable the decoder to obtain supplementary information including, for example, various feature extractions and derivations. Although claimed examples herein relate to impairment information, it is also possible to use the user data to signal other optional parameters that relate to implementations outside of a standardised implementation.

In one case, a user_data_enabled variable may be a k-bit variable. For example, the user_data_enabled may comprise a 2-bit variable with the following values:

| user_data_enabled | Value of type |
|---|---|
| 0 | disabled |
| 1 | enabled 2-bits |
| 2 | enabled 6-bits |
| 3 | reserved |

In this case, the user data specifying impairment information may be embedded into the last n (least) significant bits of one or more of the decoded coefficient data sets (e.g., within the encoded residual coefficient data).

When user data is enabled, e.g. to transmit signal processing information as described in examples herein, then the "in-loop" processing of transformed coefficients may be modified. Two examples of this are shown in FIGS. 2 and 4. Further, the decoding of the transformed coefficients may also be adjusted such that, when the user data is enabled, values of the particular transformed coefficient (e.g., H or HH) are set to 0 before the transformed coefficients are subject to an inverse transform. In the case set out in the table above, following extraction of the least significant n bits as reserved symbols, values of the transformed coefficient used to carry the user data may be shifted right (e.g., bit shifted) by 2 bits (>>2) if n=2 (e.g., user_data_enabled=1) or shifted right (e.g., bit shifted) by 6 bits (>>6) if n=6 (e.g., user_data_enabled=1). In one case, if the values of the transformed coefficients are D-bits in length, where D>n, n being the length of the user data in bits (e.g., 2 or 6 in the table above), then the remaining D-n bits for the transformed coefficient may be used to carry a value for the transformed coefficient (e.g., a more heavily quantised integer value compared to a full D-bit representation). In this case, the user data and the value for the transformed coefficient may be partitioned across the D-bits. In other simpler cases, the user data may be extracted and the value of the transformed coefficient may be set to 0 (i.e. such that the value of the transformed coefficient has no effect on the output of the inverse transform).

In certain examples, the user data that is used to implement the reserved symbols may be formatted according to a defined syntax. This defined syntax may partition the user data into header data and payload data. In this case, decoding of the user data may comprise parsing a first set of values received in one or more encoded data layers to extract the header data and parsing a second subsequent set of values received in one or more encoded data layers to extract the payload data. The header data may be set as a first set of a defined number of bits. For example, in the examples above with user data being defined in 2- or 6-bit values, the first x values may comprise the header data. In one case, x may equal 1, such that the first value for the user data (e.g., the transformed coefficient value for the first coding unit or data block of a given frame or plane of video) defines the header data (e.g., the 2- or 6-bits of the first value defines the header data).

In certain examples, the header data may indicate at least whether signal enhancement operations are enabled. In general, the header data may indicate global parameters for the signal enhancement operations and the payload data may indicate local parameters for the signal enhancement operations, i.e. whereby the impairment information may be localised to one or more coding units comprising m by m blocks of residual data (e.g., 2 by 2 or 4 by 4 blocks). As the impairment information is encapsulated within reserved symbols for particular coding units, tags and/or classifications (for example) may be applied to localised areas of a signal. For example, tags may indicate where a localised area of a video signal is to be modified and/or replaced.

The above embodiments are to be understood as illustrative examples. Further embodiments are envisaged.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of performing signal enhancement operations on one or more portions of a signal, the method comprising:
receiving one or more encoded data layers transmitted within a stream of encoded data, wherein:
the one or more encoded data layers include one or more values, which include embedded information,
said one or more values are associated with transformed coefficients intended to be processed by a decoder for deriving elements of the signal, and
the embedded information indicates an impairment associated with the one or more encoded data layers;
determining that an encoding process used to generate the one or more encoded data layers produced the impairment, the impairment being one that is not correctable at a decoder using residual data;
responsive to detecting the impairment, modifying coefficients of the residual data to include embedded signaling information, which is structured to initiate a signal enhancement operation that is designed to remove the impairment and that is applied during a subsequent reconstruction of the signal by the decoder, wherein said modifying of the coefficients results in generation of transformed coefficients; and
encoding the transformed coefficients by reserving one or more quantized symbols of a given coefficient group to include the embedded signaling information for the signal enhancement operation.

2. A method according to claim 1, wherein the one or more values are interpreted by the decoder to derive said information rather than to derive values of the transformed coefficients.

3. A method according to claim 1, wherein the stream of encoded data is comprised within an encoded bitstream, and wherein a bit in the encoded bitstream is used to signal to the decoder that one or more values should be interpreted as said information rather than actual quantized values of transformed coefficients.

4. A method according to claim 1, wherein the information indicates specific types of impairments to be expected in the decoded signal.

5. A method according to claim 4, wherein the information is used to inform the decoder on enhancement operations that may be applied to corresponding areas of the signal in order to improve a quality of the final signal reconstruction.

6. A method according to claim 1, wherein said enhancement operations include one or more of the following: deblocking, debanding, deringing, denoising, sharpening, dithering, colour clipping, range equalization, edge enhancement.

7. A method according to claim 6, wherein at least one of the signal enhancement processing operations performed based on the embedded signalling is performed in-loop on an intermediate rendition of the signal at a resolution lower than full resolution.

8. A method according to claim 1, wherein the decoder implements signal enhancement operations based on one or more of a target level of processing power and a battery power consumption to be used by the decoder device.

9. A method according to claim 1, wherein the signal is encoded using a tier-based hierarchical coding method.

10. A method according to claim 9, wherein embedded signalling information is included in residual data at a resolution lower than a full resolution for the signal.

11. A method according to claim 1, wherein the format in which at least a portion of the signal and the embedded signalling information are encoded is MPEG-5 Part 2 LCEVC ("Low Complexity Enhancement Video Coding").

12. A method according to claim 1, wherein the format in which at least a portion of the signal and the embedded signalling information are encoded is SMPTE VC-6 ST-2117.

13. A method of encoding a signal, said method comprising:
obtaining an encoded rendition of the signal, the encoded rendition representing the signal at a first level of quality, the encoded rendition constituting encoded data;
determining that an encoding process used to generate the encoded data produced an impairment in the encoded data, the impairment being one that is not correctable at a decoder using residual data;
responsive to detecting the impairment, modifying coefficients of the residual data to include embedded signaling information, which is structured to initiate a signal enhancement operation that is designed to remove the impairment and that is applied during a subsequent reconstruction of the rendition by the decoder, wherein said modifying of the coefficients results in generation of transformed coefficients; and
encoding the transformed coefficients by reserving one or more quantized symbols of a given coefficient group to include the embedded signaling information for the signal enhancement operation.

14. A method according to claim 13, wherein a bit in an encoded bytestream is toggled to signal to a decoder whether a given set of symbols in a given set of residual data is to be interpreted as residual data or as additional embedded signalling information to inform signal enhancement operations.

15. A method according to claim 13, wherein the embedded signalling information corresponds to one or more of the following classes of impairments: banding, ringing, softening, colour conversion flips and quantization noise impairments.

16. A method according to claim 13, wherein the signal is encoded using a tier-based hierarchical coding method.

17. A method of encoding a signal comprising:
encoding transformed coefficients for signal reconstruction by reserving one or more quantized symbols of a given coefficient group to provide embedded signaling information for signal enhancement operations to be performed on one or more portions of the signal to correct one or more impairments detected in the signal;
prior to encoding the transformed coefficients:
(i) obtaining a rendition of the signal at a first level of quality;
(ii) encoding the rendition of the signal with a first encoding method to generate a first encoded signal; and
(iii) transforming residual data for one or more layers of quality to generate the transformed coefficients, the residual data comprising corrections to a version of the signal reconstructed using the first encoded signal;
detecting one or more impairments that cannot be suitably corrected with the residual data at a target bitrate for an encoded data stream; and
responsive to detection of the one or more impairments, modifying one or more quantized symbols of a given coefficient group in the transformed coefficients to provide the embedded signaling to signal the signal enhancement operations to be performed on one or more portions of the signal at the decoder.

18. A method according to claim 17, wherein a bit in an encoded byte stream is toggled to signal to a decoder whether a given set of symbols in a given set of residual data is to be interpreted as residual data or as additional embedded signaling information to inform signal enhancement operations.

19. A method according to claim 17, wherein the embedded signaling information corresponds to one or more of the following classes of impairments: banding, ringing, softening, color conversion flips and quantization noise impairments.

20. A method of encoding a signal comprising:
encoding transformed coefficients for signal reconstruction by reserving one or more quantized symbols of a given coefficient group to provide embedded signaling information for signal enhancement operations to be performed on one or more portions of the signal to correct one or more impairments detected in the signal;
producing a rendition of the signal at a first level of quality;
encoding the rendition of the signal with a first coding method;
producing a predicted rendition of the signal at a second level of quality;
producing and encoding an echelon of residual data at the second level of quality to combine with the predicted rendition of the signal at the second level of quality in order to produce a corrected rendition of the signal at the second level of quality; and
upon detecting that the process of encoding the signal at the first level of quality produces one or more impairments that cannot be suitably corrected with the echelon of residual data at the target bitrate, using a set of reserved symbols in a set of residual data of the echelon of residual data at the second level of quality to signal to the decoder a type and/or a location of the detected impairments.

* * * * *